(12) United States Patent
Ichiki et al.

(10) Patent No.: US 11,909,197 B2
(45) Date of Patent: *Feb. 20, 2024

(54) MOTOR DRIVE DEVICE, BLOWER, COMPRESSOR, AND AIR CONDITIONER

(71) Applicant: Mitsubishi Electric Corporation, Tokyo (JP)

(72) Inventors: Satoru Ichiki, Tokyo (JP); Takuya Shimomugi, Tokyo (JP); Koichi Arisawa, Tokyo (JP); Keisuke Uemura, Tokyo (JP); Kenji Iwazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 478 days.

This patent is subject to a terminal disclaimer.

(21) Appl. No.: 17/269,701

(22) PCT Filed: Sep. 28, 2018

(86) PCT No.: PCT/JP2018/036608
§ 371 (c)(1),
(2) Date: Feb. 19, 2021

(87) PCT Pub. No.: WO2020/066031
PCT Pub. Date: Apr. 2, 2020

(65) Prior Publication Data
US 2021/0288487 A1 Sep. 16, 2021

(51) Int. Cl.
*H02P 27/06* (2006.01)
*H02P 29/024* (2016.01)
(Continued)

(52) U.S. Cl.
CPC ........... *H02H 7/0833* (2013.01); *F25B 31/02* (2013.01); *H02H 1/0007* (2013.01); *H02P 27/08* (2013.01)

(58) Field of Classification Search
CPC .... H02P 29/027; H02P 2201/03; H02M 7/12; H02H 7/1255; F25B 31/026
See application file for complete search history.

(56) References Cited

U.S. PATENT DOCUMENTS 5,214,575 A * 5/1993 Sugishima ........... H02H 7/1216
361/42
2009/0009920 A1* 1/2009 Yamada ............... H02P 29/0241
361/93.1
(Continued)

FOREIGN PATENT DOCUMENTS

JP 59-153776 A 9/1984
JP 2000-224861 A 8/2000
(Continued)

OTHER PUBLICATIONS

International Search Report of the International Searching Authority dated Dec. 11, 2018 for the corresponding International application No. PCT/JP2018/036608 (and English translation).

*Primary Examiner* — Kawing Chan
*Assistant Examiner* — Gabriel Agared
(74) *Attorney, Agent, or Firm* — POSZ LAW GROUP, PLC

(57) ABSTRACT

A motor drive device includes a reactor, a converter circuit, a capacitor, an inverter circuit, and overcurrent determination units. The converter circuit converts a first AC voltage output from an AC power supply into a DC voltage. The capacitor smooths a second voltage on the DC side of the converter circuit. The inverter circuit converts DC power stored in the capacitor into AC power. One of the overcurrent determination units determines overcurrent based on a detected value of the first AC current, flowing between the AC power supply and the converter circuit. Another overcurrent determination unit determines overcurrent based on a detected value of the second DC current, flowing between
(Continued)

the converter circuit and the capacitor. The converter and inverter circuits stop operating when the determination result of one of the overcurrent determination units indicates an overcurrent.

15 Claims, 12 Drawing Sheets

(51) Int. Cl.
      *H02H 7/08*           (2006.01)
      *F25B 31/02*         (2006.01)
      *H02H 1/00*           (2006.01)
      *H02P 27/08*         (2006.01)

(56) References Cited

U.S. PATENT DOCUMENTS

2011/0026280 A1\* 2/2011 Saruwatari .......... H02M 5/4585
                                                                           363/37
2021/0288487 A1\* 9/2021 Ichiki ...................... H02M 7/48

FOREIGN PATENT DOCUMENTS

| JP | 2009-247065 A | 10/2009 |
|---|---|---|
| JP | 2012-005202 A | 1/2012 |

\* cited by examiner

MOTOR DRIVE DEVICE, BLOWER, COMPRESSOR, AND AIR CONDITIONER

CROSS REFERENCE TO RELATED APPLICATION

This application is a U.S. national stage application of International Patent Application No. PCT/JP2018/036608 filed on Sep. 28, 2018, the disclosure of which is incorporated herein by reference.

TECHNICAL FIELD

The present invention relates to a motor drive device for driving a motor, to a blower and a compressor each including the motor drive device, and to an air conditioner including the blower or the compressor.

BACKGROUND

A motor drive device includes a converter circuit that converts an alternating current (AC) voltage output from an AC power supply into a direct current (DC) voltage. A motor drive device is required to have a function of detecting an overcurrent that may flow into the converter circuit and protecting the switching elements included in the converter circuit from such overcurrent.

Patent Literature 1 listed below discloses, as a conventional technology, a technology provided by an inverter device incorporating an intelligent power module (IPM) having a self-protection function. The inverter device reduces regenerative current that will occur during self-protection operation of the IPM to thereby prevent a malfunction of and damage to the switching elements of the IPM. That is, the technology of Patent Literature 1 is a technology for protecting the switching elements in an IPM, using the self-protection function of the IPM.

PATENT LITERATURE

Patent Literature 1: Japanese Patent Application Laid-open No. 2000-224861

The technology of Patent Literature 1 listed above is applicable for protecting the switching elements included in a converter circuit from an overcurrent. However, even if the drive signal for driving a switching element stops being output to protect the switching element in the converter circuit from an overcurrent, a current will still flow into the smoothing capacitor through the diode connected in inverse parallel with the switching element or through the parasitic diode in the switching element. Thus, when, for example, a short-circuit fault occurs in a switching element in the converter circuit, the short-circuit path may allow an overcurrent to continue flowing through the switching element under the short-circuit fault condition. As a result, another switching element not under fault condition is likely to be adversely affected, thereby leading to propagation of the fault.

SUMMARY

The present invention has been made in view of the foregoing, and it is an object of the present invention to provide a motor drive device capable of reliably protecting the switching elements in the converter circuit.

To solve the problem and achieve the object described above, the present invention is directed to a motor drive device for driving a motor. The motor drive device comprises a reactor having one end connected to an alternating current power supply, and a converter circuit connected to another end of the reactor, the converter circuit converting a first voltage into a direct current voltage, the first voltage being an alternating current voltage output from the alternating current power supply. The motor drive device also comprises a capacitor for smoothing a second voltage, the second voltage being a voltage on a direct current side of the converter circuit, and an inverter circuit for converting direct current power stored in the capacitor into alternating current power, and supplying the alternating current power to the motor. The motor drive device further comprises a first current detector for detecting a first current, the first current being an alternating current flowing between the alternating current power supply and the converter circuit, and a second current detector detecting a second current, the second current being a direct current flowing between the converter circuit and the capacitor. The motor drive deice further comprises a first overcurrent determination unit determining, on a basis of a detected value of the first current, whether the first current is an overcurrent or not, and a second overcurrent determination unit determining, on the basis of a detected value of the second current, whether the second current is an overcurrent or not. The converter circuit stops operating in a case in which a determination result of either the first overcurrent determination unit or the second overcurrent determination unit indicates an overcurrent, and the inverter circuit stops operating in the case in which the determination result of either the first overcurrent determination unit or the second overcurrent determination unit indicates an overcurrent.

A motor drive device according to the present invention provides an advantage of reliably protecting the switching elements in the converter circuit.

DETAILED DESCRIPTION

A motor drive device, a blower, a compressor, and an air conditioner according to embodiments of the present invention will be described below with reference to the accompanying drawings. Note that the embodiments described below are not intended to limit the scope of the present invention. In addition, electrical connection is hereinafter referred to simply as "connection".

First Embodiment

Figure 1:
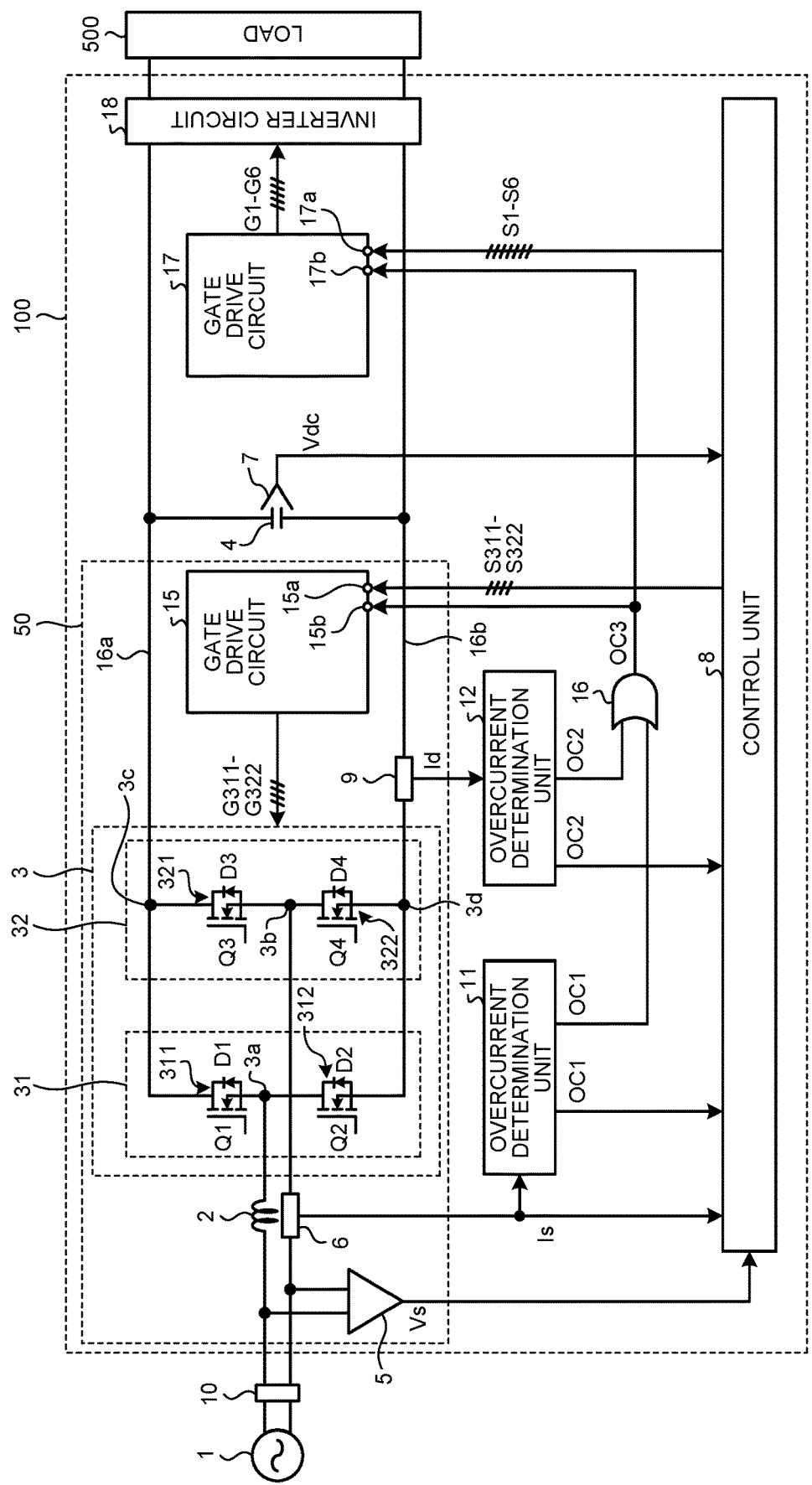
FIG. 1 is a circuit diagram illustrating a configuration of a motor drive device according to a first embodiment.

FIG. 1 is a circuit diagram illustrating a configuration of a motor drive device 100 according to a first embodiment. The motor drive device 100 according to the first embodiment is a drive unit that converts alternating current (AC) power supplied from a single-phase AC power supply 1 into direct current (DC) power, reconverts the DC power obtained by the conversion into AC power, and supplies the AC power obtained by the reconversion to a load 500 to thereby drive the load 500.

The motor drive device 100 according to the first embodiment includes, as illustrated in FIG. 1, a DC power unit 50, a capacitor 4, and a control unit 8. The DC power unit 50 is a power unit that converts the AC power supplied from the single-phase AC power supply 1 into DC power. The DC power unit 50 includes a reactor 2, a converter circuit 3, a gate drive circuit 15 (which is a first drive circuit), a voltage detector 5 (which is a first voltage detector), a current detector 6 (which is a first current detector), a voltage detector 7 (which is a second voltage detector), and a current detector 9 (which is a second current detector).

The motor drive device 100 also includes an overcurrent determination unit 11 (which is a first overcurrent determination unit), an overcurrent determination unit 12 (which is a second overcurrent determination unit), and an OR circuit 16. The motor drive device 100 further includes a gate drive circuit 17 (which is a second drive circuit) and an inverter circuit 18. The inverter circuit 18 is a circuit that converts the DC power supplied from the DC power unit 50 into AC power, and supplies the AC power obtained by the conversion to the load 500.

An example of the load 500 in FIG. 1 is a motor incorporated in a blower, in a compressor, or in an air conditioner. A circuit breaker 10 is disposed between the AC power supply 1 and the motor drive device 100. The circuit breaker 10 is a molded-case circuit breaker for protection of the motor drive device 100.

The reactor 2 has one end connected to the AC power supply 1 via the circuit breaker 10, and has another end connected to the converter circuit 3. The converter circuit 3 converts an AC voltage output from the AC power supply 1 into a DC voltage.

The converter circuit 3 includes a first leg 31 and a second leg 32. The first leg 31 and the second leg 32 are connected in parallel with each other. The first leg 31 includes a first upper-arm element 311 and a first lower-arm element 312 that are connected in series with each other. The second leg 32 includes a second upper-arm element 321 and a second lower-arm element 322 that are connected in series with each other. The other end of the reactor 2 is connected to a connection point 3a between the first upper-arm element 311 and the first lower-arm element 312 in the first leg 31. The second upper-arm element 321 and the second lower-arm element 322 are connected to each other at a connection point 3b connected to one end of the AC power supply 1. In the converter circuit 3, the connection points 3a and 3b act as AC terminals.

Note that FIG. 1 illustrates the reactor 2 as being connected between another end of the AC power supply 1 and the connection point 3a, but the reactor 2 may be connected between the one end of the AC power supply 1 and the connection point 3b.

The converter circuit 3 has a side on which the connection points 3a and 3b are provided, which side is referred to herein as "AC side". In addition, the AC voltage output from the AC power supply 1 is referred to herein as "power supply voltage", and the period of the power supply voltage is referred to herein as "power supply period". Note that the power supply voltage may also be referred to herein as "first voltage".

The first upper-arm element 311 includes a switching element Q1 and a diode D1 connected in inverse parallel with the switching element Q1. The first lower-arm element 312 includes a switching element Q2 and a diode D2 connected in inverse parallel with the switching element Q2. The second upper-arm element 321 includes a switching element Q3 and a diode D3 connected in inverse parallel with the switching element Q3. The second lower-arm element 322 includes a switching element Q4 and a diode D4 connected in inverse parallel with the switching element Q4. Note that the switching elements Q1 to Q4 may each be referred to herein as "first switching element".

FIG. 1 illustrates the switching elements Q1, Q2, Q3, and Q4 each as a metal-oxide-semiconductor field-effect transistor (MOSFET) by way of example, but the switching elements Q1, Q2, Q3, and Q4 are not each limited to a MOSFET. A MOSFET is a switching element that allows a bidirectional flow of current between the drain and the source. The switching elements Q1, Q2, Q3, and Q4 may be any type of switching elements that allow bidirectional flows of current between first terminals serving as the drains and second terminals serving as the sources. That is, the switching elements Q1, Q2, Q3, and Q4 may be any type of bidirectional elements.

In addition, the term "inverse parallel" here means that a first terminal serving as the drain of a MOSFET is connected with the cathode of the diode, and a second terminal serving as the source of the MOSFET is connected with the anode of the diode. Note that the diode may be a parasitic diode included inside the MOSFET itself. A parasitic diode is also called a body diode.

In addition, at least one of the switching elements Q1, Q2, Q3, and Q4 is not limited to a MOSFET formed of a silicon-based material, and may be a MOSFET formed of a wide bandgap semiconductor such as silicon carbide, gallium nitride, gallium oxide, or diamond.

A wide bandgap semiconductor generally has higher voltage resistance and higher heat resistance than those of a silicon semiconductor. Thus, use of a wide bandgap semiconductor for at least one of the switching elements Q1, Q2, Q3, and Q4 provides increased voltage resistance and increased allowable current density of that switching element, which can provide a size reduction of a semiconductor module incorporating the switching element.

The capacitor 4 has one end connected to a DC bus 16a at a higher potential. The DC bus 16a extends from a connection point 3c between the first upper-arm element 311 in the first leg 31 and the second upper-arm element 321 in the second leg 32. The capacitor 4 has another end connected to a DC bus 16b at a lower potential. The DC bus 16b extends from a connection point 3d between the first lower-arm element 312 in the first leg 31 and the second lower-arm element 322 in the second leg 32. In the converter circuit 3, the connection points 3c and 3d act as DC terminals. In addition, the converter circuit 3 has a side on which the connection points 3c and 3d are provided, which side is referred to herein as "DC side".

The converter circuit 3 outputs a voltage that is applied to both ends of the capacitor 4. The capacitor 4 smooths the voltage output from the converter circuit 3. The capacitor 4 is connected to the DC buses 16a and 16b. The voltage smoothed by the capacitor 4 is referred to herein as "bus voltage". Note that the bus voltage may also be referred to herein as "second voltage". The bus voltage is also a voltage applied across the inverter circuit 18.

The voltage detector 5 detects the power supply voltage, and outputs a detected value Vs of the power supply voltage to the control unit 8. The power supply voltage has a value that is the absolute value of an instantaneous voltage of the AC power supply 1. Note that the root mean square value of the instantaneous voltage may be used as the power supply voltage.

The current detector 6 detects an AC current flowing between the AC power supply 1 and the converter circuit 3, and outputs a detected value Is of the AC current to the control unit 8 and to the overcurrent determination unit 11. An example of the current detector 6 is a current transformer (CT). Note that the AC current flowing between the AC power supply 1 and the converter circuit 3 may be referred to herein as "first current".

The voltage detector 7 detects the bus voltage, and outputs a detected value Vdc of the bus voltage to the control unit 8.

The current detector 9 is disposed on the DC bus 16b. The current detector 9 detects a DC current flowing between the negative electrode-side terminal of the capacitor 4 and the connection point 3d of the converter circuit 3, and outputs a detected value Id of the DC current to the overcurrent determination unit 12. An example of the current detector 9 is a shunt resistor. Note that the DC current flowing between the converter circuit 3 and the capacitor 4 may be referred to herein as "second current". FIG. 1 illustrates the current detector 9 as being disposed on the DC bus 16b, but the current detector 9 may also be disposed on the DC bus 16a. In this case, the current detector 9 detects a DC current flowing between the connection point 3c of the converter circuit 3 and the positive electrode-side terminal of the capacitor 4.

On the basis of the detected value Vs of the voltage detector 5, the detected value Is of the current detector 6, and the detected value Vdc of the voltage detector 7, the control unit 8 generates control signals S311 to S322 for controlling the switching elements in the converter circuit 3. The control signal S311 is a control signal for controlling the switching element Q1, and the control signal S322 is a control signal for controlling the switching element Q4. The switching elements Q2 and Q3 are also each controlled by a control signal from the control unit 8. The control signals S311 to S322 generated by the control unit 8 are input to an input port 15a of the gate drive circuit 15.

On the basis of the detected value Vs of the voltage detector 5, the detected value Is of the current detector 6, and the detected value Vdc of the voltage detector 7, the control unit 8 also generates control signals S1 to S6 for controlling switching elements (not illustrated in FIG. 1) included in the inverter circuit 18. The inverter circuit 18 has a three-phase circuit configuration, and accordingly includes six switching elements in correspondence to the three-phase circuit configuration. Furthermore, the six control signals S1 to S6 are generated in correspondence to the six switching elements. The control signals S1 to S6 generated by the control unit 8 are input to an input port 17a of the gate drive circuit 17.

On the basis of the control signals S311 to S322, the gate drive circuit 15 generates drive pulses G311 to G322 for driving the switching elements in the converter circuit 3. The drive pulse G311 is a drive pulse for driving the switching element Q1, and the drive pulse G322 is a drive pulse for driving the switching element Q4. The switching elements Q2 and Q3 are also each driven by a drive pulse from the gate drive circuit 15.

On the basis of the control signals S1 to S6, the gate drive circuit 17 generates drive pulses G1 to G6 for driving the switching elements in the inverter circuit 18.

The overcurrent determination unit 11 determines, on the basis of the detected value Is of the AC current, whether the AC current is an overcurrent or not, and outputs a determination result OC1 to the control unit 8 and to the OR circuit 16. The determination of whether the AC current is the overcurrent or not is made using threshold A, which is a first threshold. If the detected value Is of the AC current is greater than threshold A, the overcurrent determination unit 11 determines that the AC current is an overcurrent, and sets the determination result OC1 to a logical "1". Alternatively, if the detected value Is of the AC current is less than or equal to threshold A, the overcurrent determination unit 11 determines that the AC current is not an overcurrent, and sets the determination result OC1 to a logical "0". Note that although this determination process determines that the AC current "is not an overcurrent" when the detected value Is is equal to threshold A, the AC current may be determined to "be an overcurrent".

The overcurrent determination unit 12 determines, on the basis of the detected value Id of the DC current, whether the DC current is an overcurrent or not, and outputs a determination result OC2 to the control unit 8 and to the OR circuit 16. The determination of whether the DC current is the overcurrent or not is made using threshold B, which is a second threshold. If the detected value Id of the DC current is greater than threshold B, the overcurrent determination unit 12 determines that the DC current is an overcurrent, and sets the determination result OC2 to a logical "1". Alternatively, if the detected value Id of the DC current is less than or equal to threshold B, the overcurrent determination unit 12 determines that the DC current is not an overcurrent, and sets the determination result OC2 to a logical "0". Note that although this determination process determines that the DC current "is not an overcurrent" when the detected value Id is equal to threshold B, the DC current in question may be determined to "be an overcurrent".

The OR circuit 16 performs a logical sum operation on the determination result OC1 and the determination result OC2. Specifically, if at least one of the determination result OC1 and the determination result OC2 is a logical "1", the OR circuit 16 sets a logical value OC3 to a logical "1". Alternatively, if both the determination result OC1 and the determination result OC2 are logical "0", the OR circuit 16 sets the logical value OC3 to a logical "0". The logical value OC3 determined by the OR circuit 16 represents the result of overcurrent detection. The logical value OC3 is input to an input port 15b of the gate drive circuit 15 and to an input port 17b of the gate drive circuit 17.

In a case in which the logical value OC3 is a logical "1", the gate drive circuit 15 stops outputting the drive pulses G311 to G322 for driving the switching elements of the converter circuit 3. That is, when a logical "1" is being input to the input port 15b from the OR circuit 16, outputting of the drive pulses G311 to G322 to the converter circuit 3 is cut off even when the control signals S311 to S322 from the control unit 8 are being input to the input port 15a.

Otherwise, in a case in which the logical value OC3 is a logical "0", the gate drive circuit 15 performs normal operation. That is, when the control signals S311 to S322 from the control unit 8 are being input to the input port 15a, the gate drive circuit 15 generates the drive pulses G311 to G322 on the basis of the control signals S311 to S322, and outputs the generated drive pulses G311 to G322 to the converter circuit 3.

In addition, in the case in which the logical value OC3 is a logical "1", the gate drive circuit 17 stops outputting the drive pulses G1 to G6 for driving the switching elements of the inverter circuit 18. That is, when a logical "1" is being input to the input port 17b from the OR circuit 16, outputting of the drive pulses G1 to G6 to the inverter circuit 18 is cut off even when the control signals S1 to S6 from the control unit 8 are being input to the input port 17a.

Moreover, in the case in which the logical value OC3 is a logical "0", the gate drive circuit 17 performs normal operation. That is, when the control signals S1 to S6 from the control unit 8 are being input to the input port 17a, the gate drive circuit 17 generates the drive pulses G1 to G6 on the basis of the control signals S1 to S6, and outputs the generated drive pulses G1 to G6 to the inverter circuit 18.

The foregoing control causes each of the converter circuit 3 and the inverter circuit 18 to stop switching operations of all of the switching elements therein when the determination result of either the overcurrent determination unit 11 or the overcurrent determination unit 12 indicates an overcurrent. This stops supply of power from the DC power unit 50 and the capacitor 4 to the load 500.

In addition, the control unit 8 receives the determination result OC1 and the determination result OC2, and in a case in which at least one of the determination result OC1 and the determination result OC2 is a logical "1", stops generation of the control signals S311 to S322, and stops generation of the control signals S1 to S6. As a result, the control signals S311 to S322 are not input to the gate drive circuit 15. Thus, outputting of the drive pulses G311 to G322 to the converter circuit 3 is stopped. Also, the control signals S1 to S6 are not input to the gate drive circuit 17. Thus, outputting of the drive pulses G1 to G6 to the inverter circuit 18 is stopped.

The stop control using the overcurrent determination unit 11, the overcurrent determination unit 12, and the OR circuit 16 is performed only when an overcurrent is flowing. The stop control is hereinafter referred to as "first stop control" as appropriate. In addition, the first stop control is performed prior to the stop control performed by the control unit 8 on the basis of the determination results of the overcurrent determination unit 11 and the overcurrent determination unit 12. The stop control performed by the control unit 8 is hereinafter referred to as "second stop control" as appropriate. This enables fast protection control to be performed on the switching elements of the converter circuit 3.

Moreover, the second stop control continues to be performed once an overcurrent is detected. Therefore, performing of the first stop control and the second stop control in combination can reliably prevent propagation of the fault to a normal switching element in the converter circuit 3.

A circuit operation of a main part in the DC power unit 50 in the first embodiment will next be described with reference to the drawings of FIGS. 1 to 5.

Figure 2:
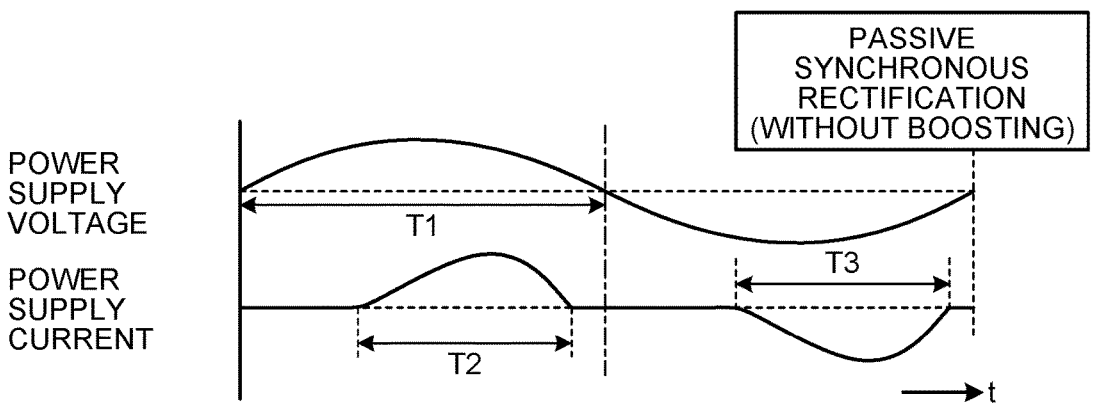
FIG. 2 is a diagram for describing operation modes of the DC power unit in the first embodiment.
Figure 2:
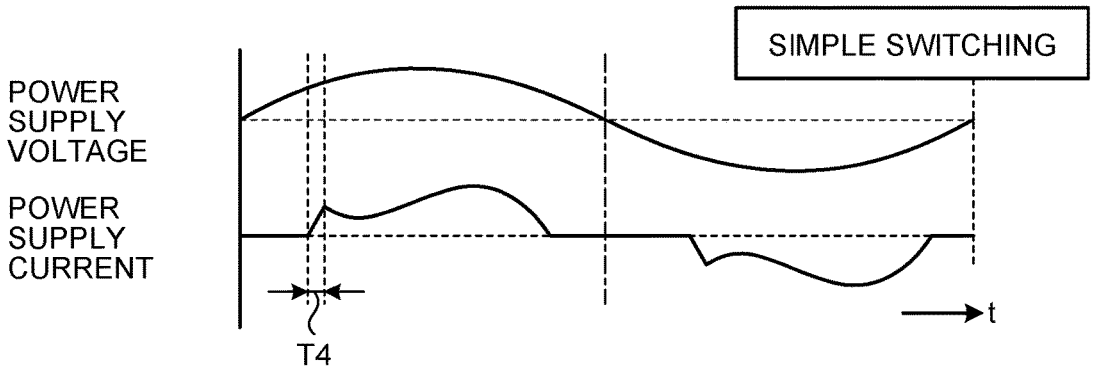
Figure 2:
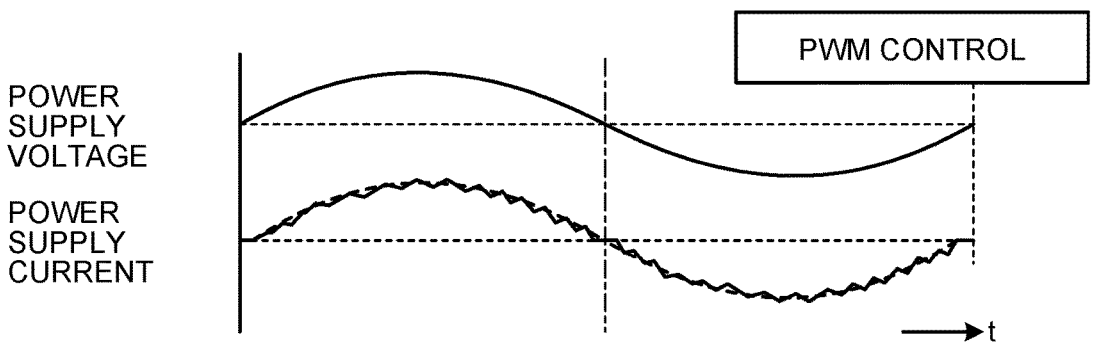
Figure 3:
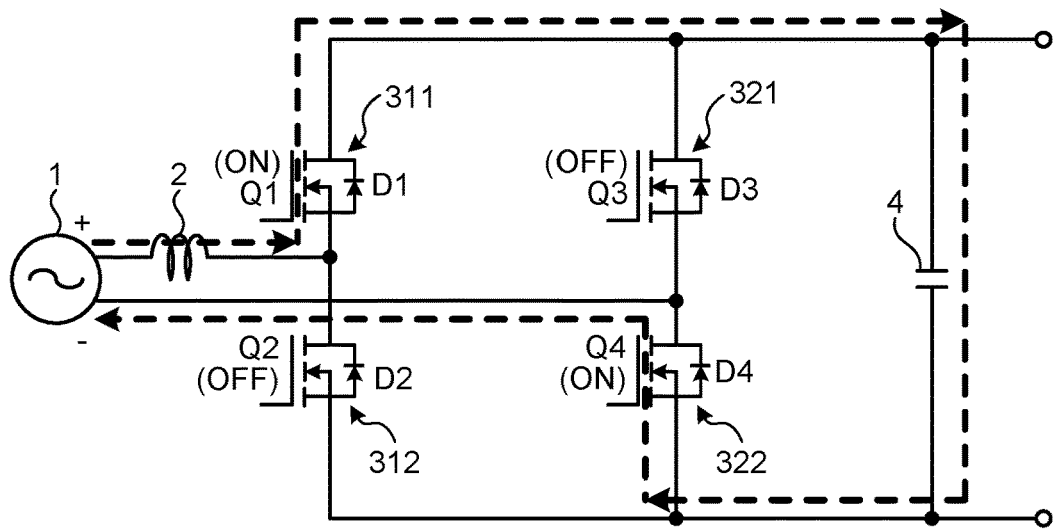
FIG. 3 is a diagram illustrating one of current paths in a converter circuit 3 of the first embodiment in the passive synchronous rectification mode.
Figure 4:
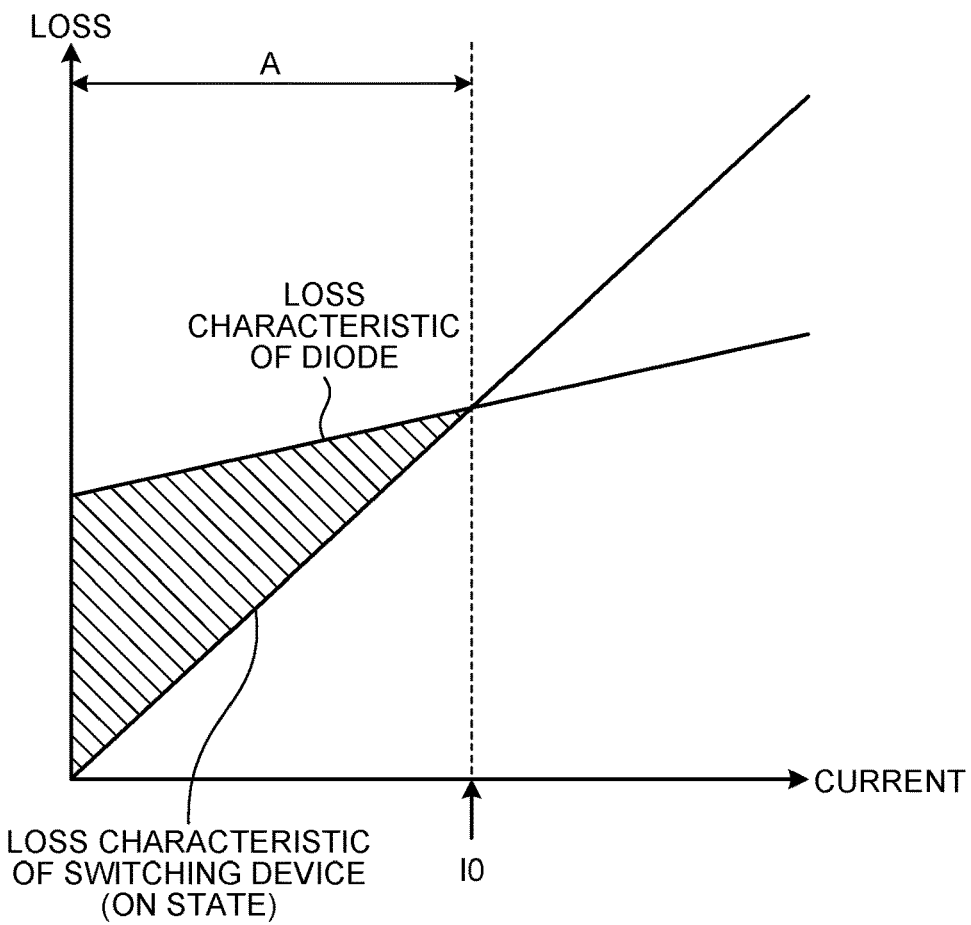
FIG. 4 is a chart schematically illustrating a current-loss characteristic in a typical switching element.
Figure 5:
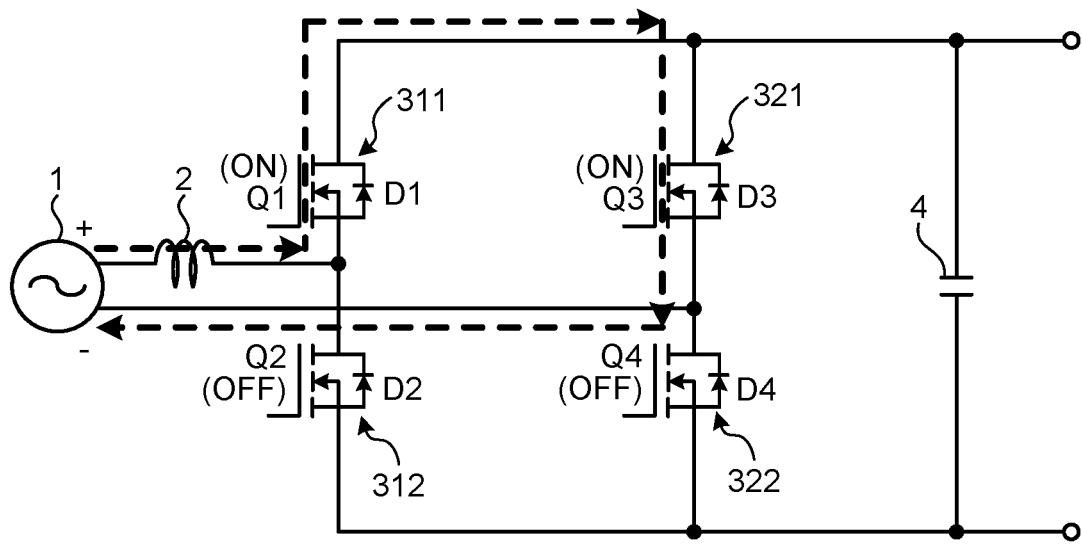
FIG. 5 is a diagram illustrating one of current paths in the converter circuit of the first embodiment in the simple switching mode.

FIG. 2 is a diagram for describing operation modes of the DC power unit 50 in the first embodiment. FIG. 2 illustrates three operation modes: a passive synchronous rectification mode, a simple switching mode, and a pulse width modulation (PWM) control mode. FIG. 3 is a diagram illustrating one of current paths in the converter circuit 3 of the first embodiment in the passive synchronous rectification mode. FIG. 4 is a chart schematically illustrating a current-loss characteristic in a typical switching element. FIG. 5 is a diagram illustrating one of current paths in the converter circuit 3 of the first embodiment in the simple switching mode.

The upper section of FIG. 2 illustrates the power supply voltage and a power supply current in the passive synchronous rectification mode. This operation mode is a mode of performing synchronous rectification without boosting. The phrase "without boosting" herein means that a power-supply short-circuit operation is not performed. Note that the power-supply short-circuit operation will be described later herein. In addition, synchronous rectification is a control method of turning on the switching element connected in inverse parallel with a diode at the same timing as a current can flow through that diode.

FIG. 3 illustrates a path for charging the capacitor 4 when the power supply voltage has a positive polarity during synchronous rectification. As illustrated in FIG. 3, the polarity of the power supply voltage is herein defined as being positive when the upper-side terminal of the AC power supply 1 is positive in potential. Alternatively, the polarity of the power supply voltage is herein defined as being negative when the upper-side terminal of the AC power supply 1 is negative in potential.

In FIG. 3, when the capacitor 4 is charged by the current supplied from the AC power supply 1 without the switching elements Q1 and Q4 being turned on, a current flows sequentially from the AC power supply 1, through the reactor 2, the diode D1, the capacitor 4, and the diode D4, back to the AC power supply 1. A diode does not conduct current unless a voltage equivalent to the voltage drop is applied in the direction of the current flow, i.e., in the forward direction. Accordingly, as illustrated in the upper section of FIG. 2, a current flows during time period T2 shorter than half period T1, within a time period of half period T1 in which the power supply voltage is positive. In the passive synchronous rectification mode, the switching elements Q1 and Q4 are controlled such that the switching elements Q1 and Q4 are turned on at the same timing as the diodes D1 and D4 can conduct current during time period T2. Thus, during time period T2, a current flows sequentially from the AC power supply 1, through the reactor 2, the switching element Q1, the capacitor 4, and the switching element Q4, back to the AC power supply 1.

A similar operation is performed also within a half period in which the power supply voltage is negative. Specifically, the switching elements Q2 and Q3 are controlled such that the switching elements Q2 and Q3 are turned on at the same timing as the diodes D2 and D3 can conduct current during time period T3 within the half period in which the power supply voltage is negative.

FIG. 4 illustrates a loss characteristic of a diode and a loss characteristic of a switching element in an On state. As illustrated in FIG. 4, the loss of a diode is greater than the loss of a switching element in region A in which the magnitude of the current is lower than a current value I0. High efficiency operation of a device can be achieved by utilizing this characteristic and synchronous rectification that allows the switching element connected in inverse parallel with the diode to be turned on at the same timing as a current can flow through that diode.

In addition, the middle section of FIG. 2 illustrates the power supply voltage and the power supply current in the simple switching mode. This operation mode is an operation mode of performing one or several power-supply short-circuit operations during a time period within the half period of the power supply voltage. Note that, in the example illustrated in the middle section of FIG. 2, one power-supply short-circuit operation is performed during a time period within the half period of the power supply voltage.

FIG. 5 illustrates the AC power supply 1 short-circuited by a short-circuit path via the reactor 2 when the power supply voltage has a positive polarity during synchronous rectification. As illustrated in FIG. 5, the switching elements Q1 and Q3 are turned on during time period T4. This operation causes a current to flow sequentially from the AC power supply 1, through the reactor 2, the switching element Q1, and the switching element Q3, back to the AC power supply 1, such that electric energy is stored in the reactor 2.

After time period T4, the operation switches to an operation in the passive synchronous rectification mode illustrated in the upper section of FIG. 2. A total voltage of the voltage of the AC power supply 1 and the voltage generated across the reactor 2 is applied to the converter circuit 3 immediately after time period T4. This causes the diodes D1 and D4 of the converter circuit 3 to conduct current. At the same timing as the diodes D1 and D4 can conduct current, the switching elements Q1 and Q4 are turned on to thereby allow flow of the power supply current.

Note that although FIG. 5 illustrates turning on the switching elements Q1 and Q3, the switching elements Q2 and Q4 may instead be turned on. In this case, a current will flow sequentially from the AC power supply 1, through the reactor 2, the switching element Q2, and the switching element Q4, back to the AC power supply 1.

A similar operation is performed also in the negative half period. After one or several power-supply short-circuit operations, the operation switches to a passive synchronous rectification operation. In the power-supply short-circuit operation, the switching elements Q1 and Q3 may be turned on, or the switching elements Q2 and Q4 may be turned on.

Furthermore, the lower section of FIG. 2 illustrates the power supply voltage and the power supply current in the PWM control mode. In this operation mode, a power-supply short-circuit operation to store electric energy in the reactor 2, and a charging operation to charge the capacitor 4 using the electric energy stored in the reactor 2 are alternately repeated. Changeover between the power-supply short-circuit operation and the charging operation is performed at a high frequency in a range from several kilohertz to several tens of kilohertz. As a result, the power supply current is controlled such that the power supply current takes a sinusoidal shape as illustrated in the lower section of FIG. 2.

The foregoing three modes are changed over based on a load condition. This enables the DC power unit 50 to operate with high efficiency.

Figure 6:
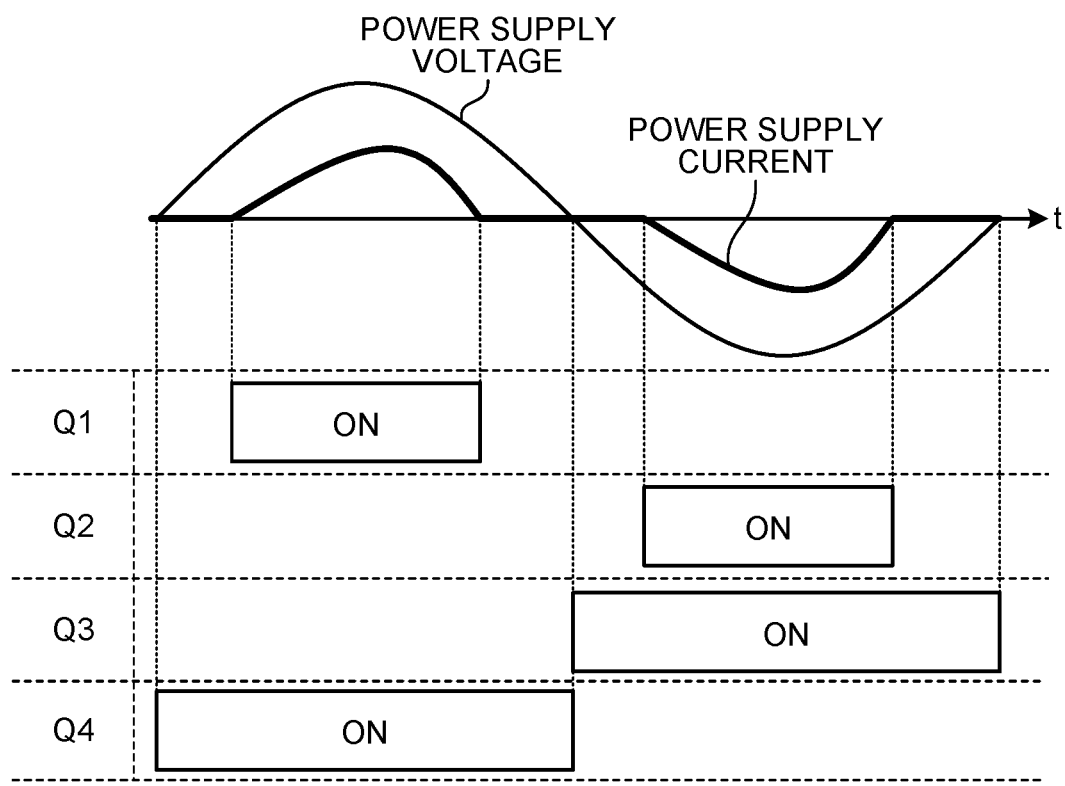
FIG. 6 is a first diagram for describing a cause of occurrence of an overcurrent in the converter circuit of the first embodiment.
Figure 7:
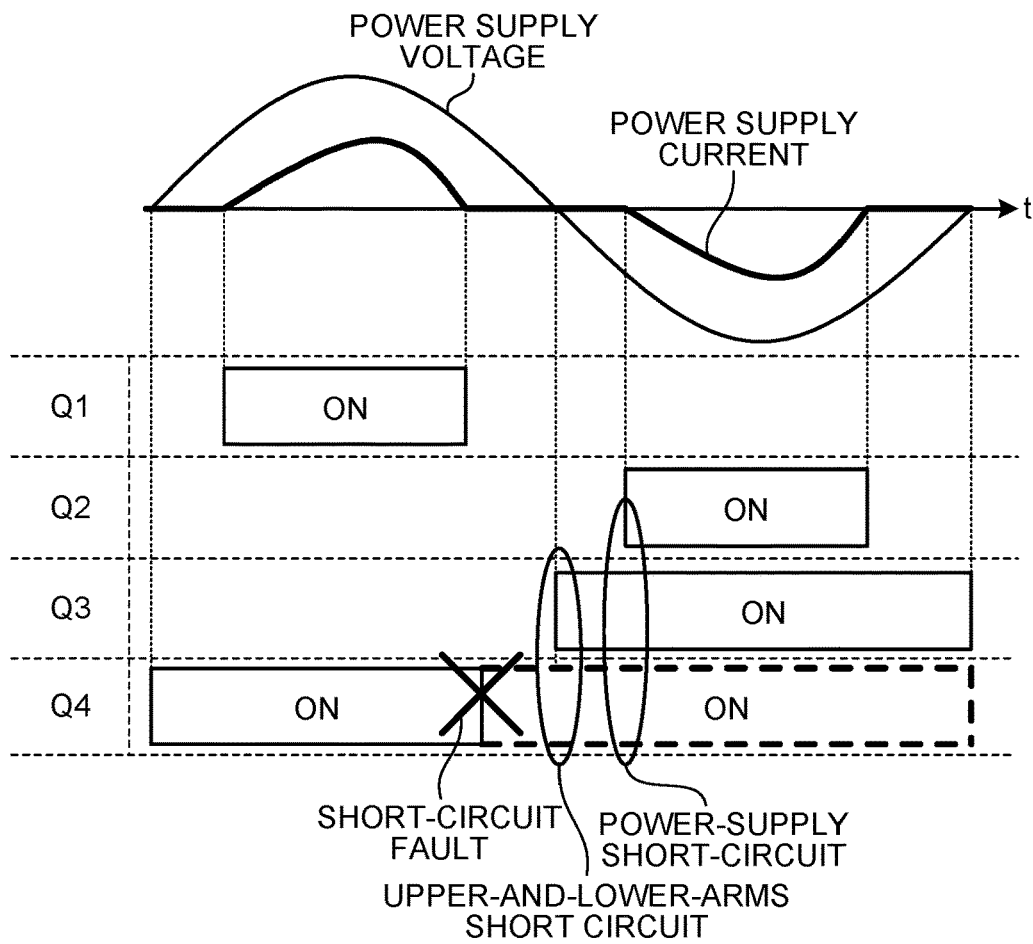
FIG. 7 is a second diagram for describing a cause of occurrence of an overcurrent in the converter circuit of the first embodiment.
Figure 8:
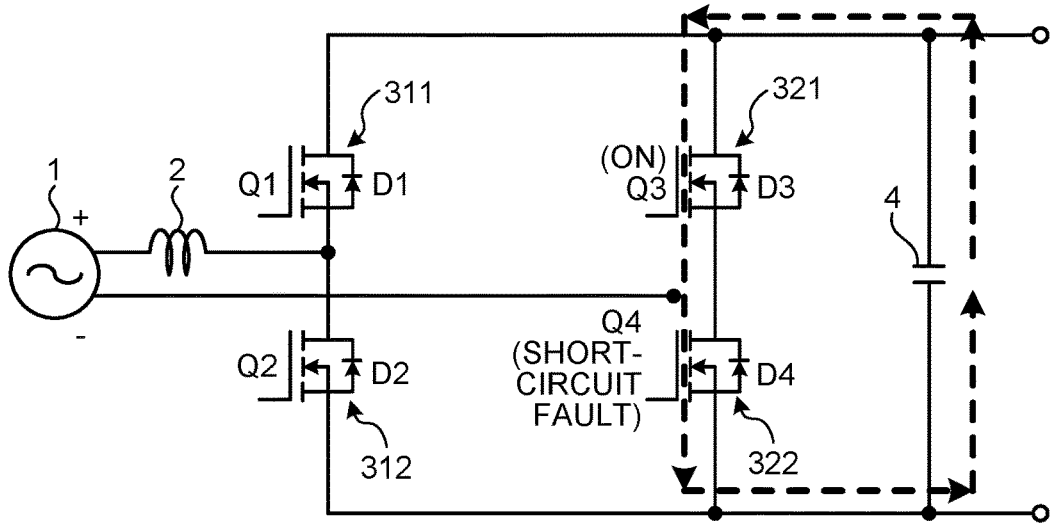
FIG. 8 is a first diagram for describing a path of an overcurrent flowing through the converter circuit of the first embodiment.
Figure 9:
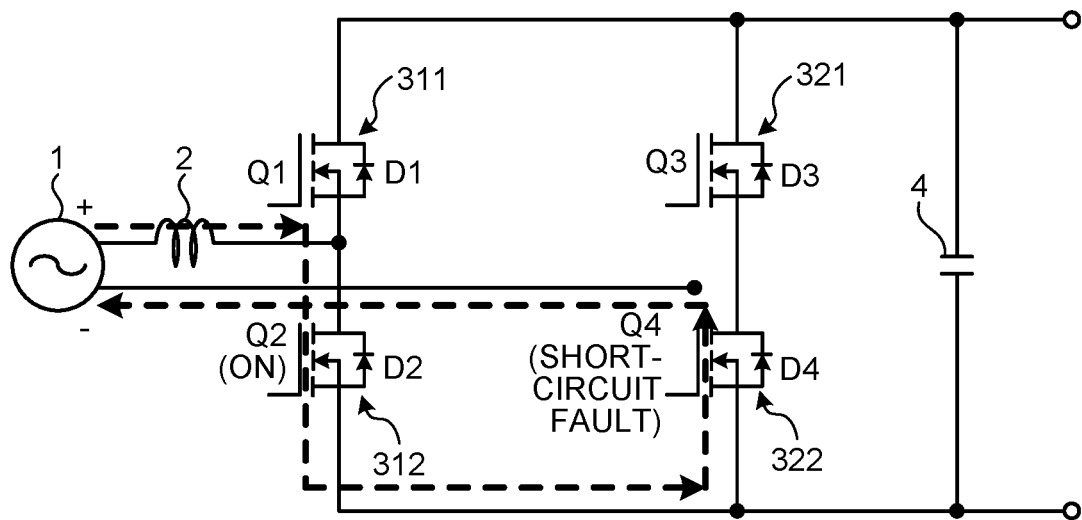
FIG. 9 is a second diagram for describing a path of an overcurrent flowing through the converter circuit of the first embodiment.

The cause of occurrence of an overcurrent through the converter circuit 3 of the first embodiment and paths of flow of the overcurrent will next be described with reference to FIGS. 6 to 9. FIG. 6 is a first diagram for describing a cause of occurrence of an overcurrent in the converter circuit 3 of the first embodiment. FIG. 7 is a second diagram for describing a cause of occurrence of an overcurrent in the converter circuit 3 of the first embodiment. FIG. 8 is a first diagram for describing a path of an overcurrent flowing through the converter circuit 3 of the first embodiment. FIG. 9 is a second diagram for describing a path of an overcurrent flowing through the converter circuit 3 of the first embodiment.

FIG. 6 illustrates an example of the states of the switching elements Q1 to Q4 in the converter circuit 3 of FIG. 1. The example of FIG. 6 illustrates the above-described passive synchronous rectification mode in which turn-on control and turn-off control are alternately performed on the switching elements Q3 and Q4 over the period of the power supply voltage, and the turn-on control is performed on the switching elements Q1 and Q2 for synchronous rectification. Note that the switching elements Q1 to Q4 are in an OFF state during the time periods other than the time periods indicated as "ON".

FIG. 7 illustrates the operational states upon occurrence of a short-circuit fault in the switching element Q4 illustrated in the state diagram of FIG. 6. As illustrated in FIG. 7, a short-circuit fault of the switching element Q4 in a certain time period will result in an upper-and-lower-arms short circuit, in which the switching elements Q3 and Q4 conduct current concurrently, in the next half period after the occurrence of the short-circuit fault. FIG. 8 illustrates the current path in such a situation. Note that the mode to create the current path illustrated in FIG. 8 is referred to herein as "short circuit mode 1" for convenience.

In this situation, the current flowing between the converter circuit 3 and the capacitor 4 short-circuits the DC voltage although the current flows through the two switching elements Q3 and Q4. Accordingly, short circuit mode 1 causes a high short-circuit current as high as several hundred amperes to flow in several microseconds. This short-circuit current is the cause of the "overcurrent flowing between the converter circuit 3 and the capacitor 4" described above. Thus, whether this short-circuit current is an overcurrent or not is detected by the current detector 9, the overcurrent determination unit 12, and the OR circuit 16.

In addition, in FIG. 7, a power-supply short-circuit will occur in which the switching elements Q2 and Q4 conduct current, at a timing when the switching element Q2 is turned on. FIG. 9 illustrates the current path in this situation. Note that the mode to create the current path illustrated in FIG. 9 is referred to herein as "short circuit mode 2" for convenience.

The current due to short circuit mode 2 is a short-circuit current flowing via the reactor 2. Accordingly, in short circuit mode 2, a short-circuit current of approximately a dozen amperes will flow in several milliseconds. This short-circuit current is the cause of the "overcurrent flowing between the AC power supply 1 and the converter circuit 3" described above. Thus, whether this short-circuit current is an overcurrent or not is detected by a combination of the current detector 6, the overcurrent determination unit 11, and the OR circuit 16.

Note that although the foregoing has been described using the example in which a short-circuit fault occurs in the switching element Q4, occurrence of a short-circuit fault in at least one of the switching elements Q1 to Q3 will also result in similar states of short circuit modes 1 and 2.

In addition, even when no short-circuit fault occurs in the switching elements Q1 to Q4, a switching element may malfunction due to external noise, which may result in occurrence of similar states of short circuit modes 1 and 2. Also in such case, the motor drive device 100 according to the first embodiment is capable of detecting a short-circuit current, and is effective in protection of the motor drive device 100.

Figure 10:
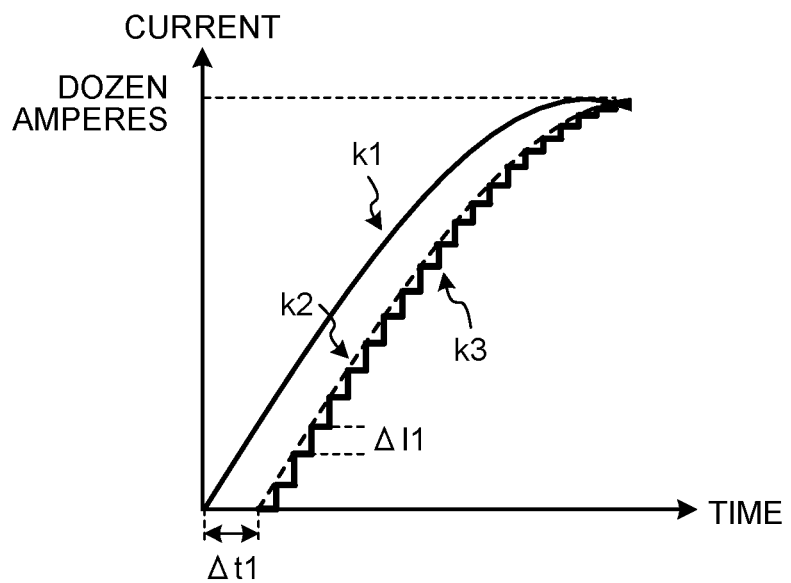
FIG. 10 is a chart for describing the detection accuracy and the detection speed required of the first current detector in the first embodiment.
Figure 11:
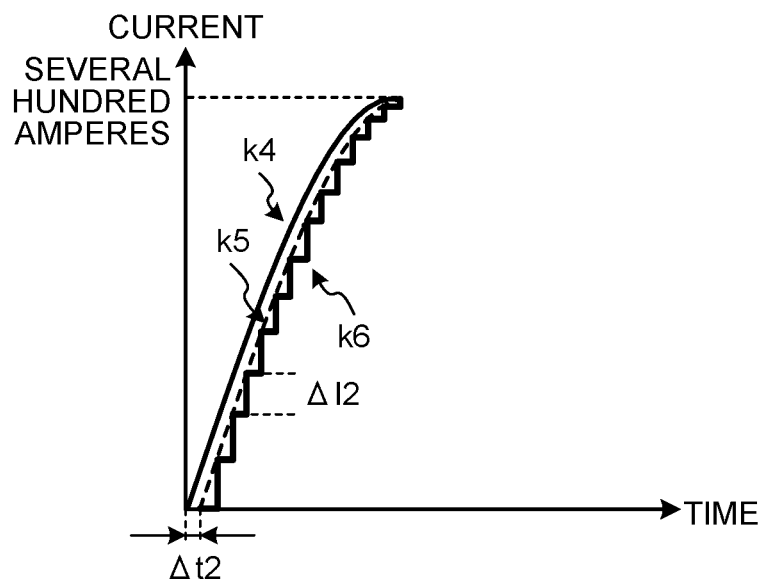
FIG. 11 is a chart for describing the detection accuracy and the detection speed required of the second current detector in the first embodiment.

The detection accuracy and the detection speed required of the current detectors 6 and 9, which are current detection components for detecting an overcurrent, will next be described. FIG. 10 is a chart for describing the detection accuracy and the detection speed required of the current detector 6 in the first embodiment. FIG. 11 is a chart for describing the detection accuracy and the detection speed required of the current detector 9 in the first embodiment.

In FIG. 10, curved line k1 illustrated by the solid line represents a rising characteristic of a current that flows in short circuit mode 2, while in FIG. 11, curved line k4 illustrated by the solid line represents a rising characteristic of a current that flows in short circuit mode 1. Note that FIGS. 10 and 11 are each a schematic diagram, and the horizontal axes representing the time and the vertical axes representing the current use different scales.

As illustrated in FIGS. 10 and 11, the current that flows in short circuit mode 1 has a more rapid rising characteristic than the rising characteristic of the current that flows in short circuit mode 2. For this reason, the current detector 9 is required to have a higher detection speed than that of the current detector 6. Thus, a current detection delay time $\Delta t2$ relative to curved line k4 needs to be shorter than a current detection delay time $\Delta t1$ relative to curved line k1. By way of example, the delay time $\Delta t2$ is in a range from about 0.1 to about 1 μs, and the delay time $\Delta t1$ is in a range from about 10 to about 100 μs.

In FIG. 10, curved line k2 illustrated by the broken line is obtained by shifting curved line k1 by $\Delta t1$ in the positive direction of the time axis, and stepped curved line k3 illustrated by the bold solid line represents discrete detected values when the current value on curved line k2 is detected in a specific processing time. Similarly, in FIG. 11, curved line k5 illustrated by the broken line is obtained by shifting curved line k4 by $\Delta t2$ in the positive direction of the time axis, and stepped curved line k6 illustrated by the bold solid line represents discrete detected values when the current value on curved line k5 is detected in a specific processing time.

In curved line k3 of FIG. 10 and in curved line k6 of FIG. 11, by way of example, a resolution $\Delta I2$ in curved line k6 is in a range from about 10 to about 100 amperes, and a resolution $\Delta I1$ in curved line k3 is in a range from about 0.01 to about 1 ampere. That is, the resolution $\Delta I2$ of the detected value of the current detector 9 may be lower than the resolution $\Delta I1$ of the detected value of the current detector 6.

As described above, the current detector 6 may have a lower current detection speed than the current detection speed of the current detector 9. As a result, already-existing current detection components provided to control the switching elements of the converter circuit 3 can be used as the current detector 6. That is, this eliminates the necessity for adding a new current detection component for detecting an overcurrent due to short circuit mode 2. This allows cost reduction, and can prevent reduction in the reliability of the motor drive device 100.

In addition, although high speed performance is required of the current detector 9, an error of about a dozen amperes is acceptable to the current detector 9, and the resolution of the detected value thereof may thus be lower than the resolution of the current detector 6. This allows the current detector 9 to be implemented at a lower cost than the current detector 6. This can achieve a system configuration that can reduce a cost increase even when a new current detection component is needed.

Note that, as described above, a current Is1 due to short circuit mode 1 and a current Is2 due to short circuit mode 2 satisfy a relationship of Is1>Is2. Accordingly, threshold A, which is the determination threshold in the overcurrent determination unit 11 to determine occurrence of an overcurrent due to short circuit mode 2, and threshold B, which is the determination threshold in the overcurrent determination unit 12 to determine occurrence of an overcurrent due to short circuit mode 1, are set to satisfy a relationship of threshold A<threshold B.

Moreover, threshold A is preferably set to a value lower than the capacity value of the circuit breaker 10. Setting threshold A to a value lower than the capacity value of the circuit breaker 10 can stop the switching operations of the switching elements Q1 to Q4 before the circuit breaker 10 trips. This can prevent propagation of the fault to switching elements other than the switching element under the short-circuit fault condition. That is, propagation of the fault to the switching elements in the converter circuit can be prevented.

Figure 12:
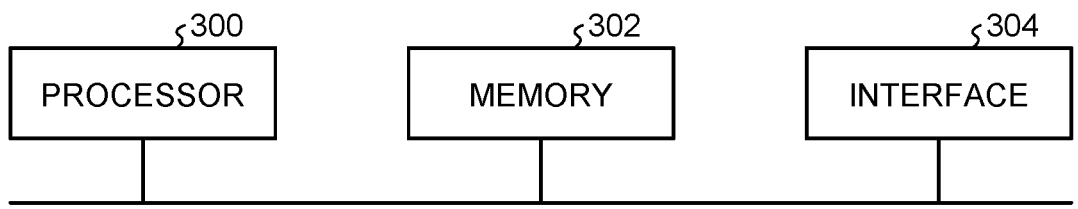
FIG. 12 is a block diagram illustrating an example of hardware configuration for implementing the functions of the control unit and the first overcurrent determination unit in the first embodiment.
Figure 13:
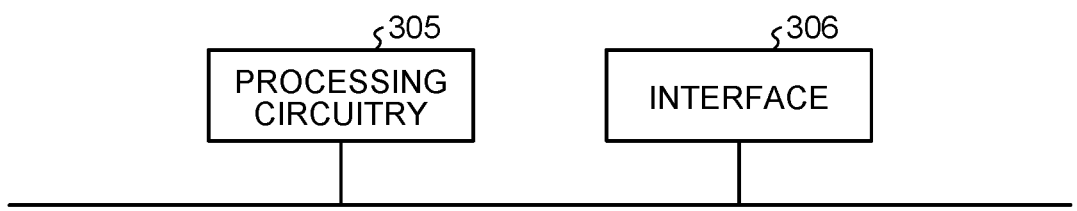
FIG. 13 is a block diagram illustrating an example of hardware configuration for implementing the function of the second overcurrent determination unit in the first embodiment.

A hardware configuration for implementing the functions of the control unit 8 and the overcurrent determination units 11 and 12 in the first embodiment will next be described with reference to the drawings of FIGS. 12 and 13. FIG. 12 is a block diagram illustrating an example of hardware configuration for implementing the functions of the control unit 8 and the overcurrent determination unit 11 in the first embodiment. FIG. 13 is a block diagram illustrating an example of hardware configuration for implementing the function of the overcurrent determination unit 12 in the first embodiment.

To implement the function of the control unit 8 in the first embodiment, a configuration can be used that includes, as illustrated in FIG. 12, a processor 300, which performs computation, a memory 302, which stores a program to be read by the processor 300, and an interface 304, which inputs and outputs a signal.

The processor 300 may be computing means such as a computing unit, a microprocessor, a microcomputer, a central processing unit (CPU), or a digital signal processor (DSP). In addition, the memory 302 may be, by way of example, a non-volatile or volatile semiconductor memory such as a random access memory (RAN), a read-only memory (ROM), a flash memory, an erasable programmable ROM (EPROM), an electrically EPROM (EEPROM) (registered trademark); a magnetic disk, a flexible disk, an optical disk, a compact disc, a MiniDisc, or a digital versatile disc (DVD).

The memory 302 stores a program for performing the functions of the control unit 8 and the overcurrent determination unit 11 in the first embodiment. The processor 300 receives and sends necessary information via the interface 304. The processor 300 executes a program stored in the memory 302. The processor 300 looks into a table stored in the memory 302. The foregoing processes can thus be performed. A computation result of the processor 300 can be stored in the memory 302.

In addition, to implement the function of the overcurrent determination unit 12 in the first embodiment, a processing circuitry 305 illustrated in FIG. 13 can be used. The processing circuitry 305 may be a single circuit, a set of multiple circuits, an application specific integrated circuit (ASIC), a field-programmable gate array (FPGA), or a combination thereof. Information to be input to the processing circuitry 305 and information to be output from the processing circuitry 305 are available via an interface 306.

As described above, the overcurrent determination unit 12 makes a determination of overcurrent on the basis of a detected value of the current flowing due to short circuit mode 1 having a rapid rising characteristic. Therefore, use of the processing circuitry 305, rather than the processor 300, is preferred.

The processes to be performed in the control unit 8 and in the overcurrent determination unit 11 may be partially performed in the processing circuitry 305 of the configuration illustrated in FIG. 13.

As described above, according to the motor drive device according to the first embodiment, the first overcurrent determination unit determines whether the first current is an overcurrent or not, on the basis of the detected value of the first current, which is an AC current flowing between the AC power supply and the converter circuit; and the second overcurrent determination unit determines whether the second current is an overcurrent or not, on the basis of the detected value of the second current, which is a DC current flowing between the converter circuit and the capacitor. This makes it possible to block the path of the current flowing into the load through the diode connected in inverse parallel with a switching element in the converter circuit or through the parasitic diode of that switching element, thereby enabling reliable protection of the switching elements in the converter circuit.

In addition, according to the motor drive device according to the first embodiment, a detected value of an already-existing current detection component can be used as the detected value of the first current for use in determination in the first overcurrent determination unit. This enables detection of an overcurrent that may flow through the DC power unit while reducing the number of current detection components to be added.

Moreover, according to the motor drive device according to the first embodiment, the switching elements in the converter circuit and the switching elements in the inverter circuit stop switching operations when the determination result of either the first overcurrent determination unit or the second overcurrent determination unit indicates an overcurrent. This can prevent, in the converter circuit, propagation of the fault to a normal switching element not under the short-circuit fault condition. That is, propagation of the fault of the switching elements can be prevented.

Second Embodiment

Figure 14:
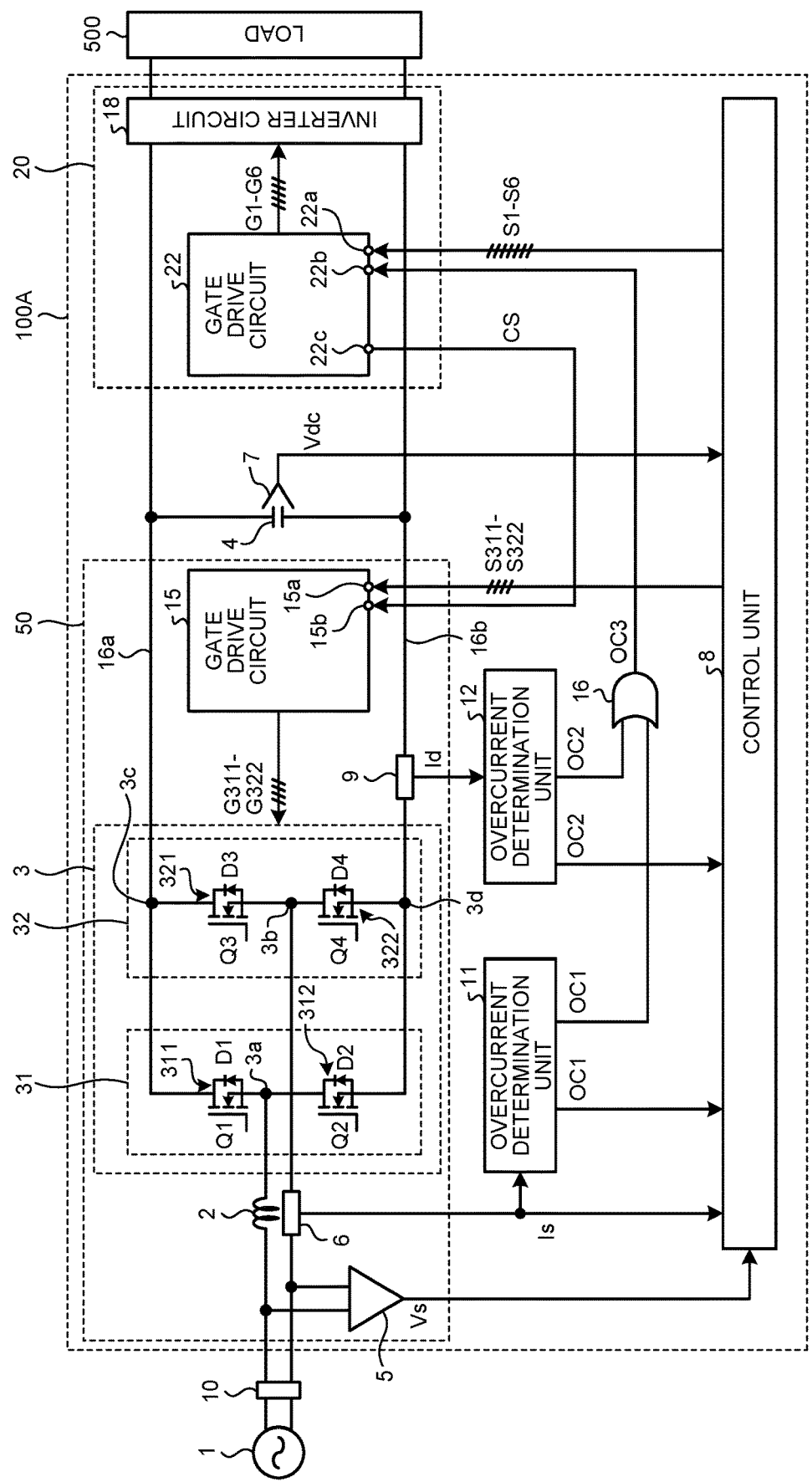
FIG. 14 is a circuit diagram illustrating a configuration of a motor drive device according to a second embodiment.

FIG. 14 is a circuit diagram illustrating a configuration of a motor drive device 100A according to a second embodiment. The motor drive device 100A according to the second embodiment illustrated in FIG. 14 includes a gate drive circuit 22 in place of the gate drive circuit 17 in the configuration of the motor drive device 100 according to the first embodiment illustrated in FIG. 1. In FIG. 14, the gate drive circuit 22 is implemented together with the inverter circuit 18 to together form an inverter module 20. The inverter module 20 is an IPM having self-protection functions as described above. The gate drive circuit 22 has input ports 22a and 22b and an output port 22c.

The configuration of FIG. 14 differs from the configuration of FIG. 1 in that the logical value OC3, which is the output of the OR circuit 16, is input to the input port 22b of the gate drive circuit 22, and that the input port 15b of the gate drive circuit 15 receives an operation stop signal CS from the output port 22c of the gate drive circuit 22. Note that the other part of the configuration is the same as or equivalent to the configuration of the first embodiment. The same or equivalent components are designated by the same reference characters, and duplicate description will be omitted.

An operation of the motor drive device 100A according to the second embodiment will next be described with reference to FIG. 14. As described above, the logical value OC3 determined by the OR circuit 16 is input to the input port 22b of the gate drive circuit 22.

In the case in which the logical value OC3 is a logical "1", the gate drive circuit 22 stops outputting the drive pulses G1 to G6 for driving the switching elements of the inverter circuit 18. That is, when a logical "1" is being input to the input port 22b from the OR circuit 16, outputting of the drive pulses G1 to G6 to the inverter circuit 18 is halted even when the control signals S1 to S6 from the control unit 8 are being input to the input port 22a.

In addition, in the case in which the logical value OC3 is a logical "1", the gate drive circuit 22 generates an operation stop signal CS for stopping the operation of the converter circuit 3, and outputs the operation stop signal CS to the gate drive circuit 15. As described above, the operation stop signal CS is input to the input port 15b of the gate drive circuit 15.

Upon receiving the operation stop signal CS, the gate drive circuit 15 stops outputting the drive pulses G311 to G322 for driving the switching elements of the converter circuit 3. That is, when a logical "1" is being input to the input port 15b from the OR circuit 16, outputting of the drive pulses G311 to G322 to the converter circuit 3 is halted even when the control signals S311 to S322 from the control unit 8 are being input to the input port 15a.

Otherwise, in the case in which the logical value OC3 is a logical "0", no operation stop signal CS is generated, and normal operation is performed. That is, when the control signals S1 to S6 from the control unit 8 are being input to the input port 22a, the gate drive circuit 22 generates the drive pulses G1 to G6 on the basis of the control signals S1 to S6, and outputs the generated drive pulses G1 to G6 to the inverter circuit 18. In addition, when the control signals S311 to S322 from the control unit 8 are being input to the input port 15a, the gate drive circuit 15 generates the drive pulses G311 to G322 on the basis of the control signals S311 to S322, and outputs the generated drive pulses G311 to G322 to the converter circuit 3.

As described above, according to the motor drive device according to the second embodiment, the second drive circuit receives a determination result indicating that at least one of the first overcurrent determination unit and the second overcurrent determination unit indicates an overcurrent, and controls the operation of the switching elements in the inverter circuit on the basis of the determination result; and when receiving a determination result indicating an overcurrent, the second drive circuit outputs a signal for stopping the operation of the converter circuit to the first drive circuit. This makes it possible to block the path of the current flowing into the load through the diode connected in inverse parallel with a switching element in the converter circuit or through the parasitic diode of that switching element, thereby enabling more reliable protection of the switching elements in the converter circuit.

Note that a general-purpose IPM has a signal latching function. A latching function is a function of, until a reset is performed, holding the level or information of a signal that has been input at a certain timing. The operation stop signal CS may be output utilizing this latching function. Use of a latching function allows the operation stop signal CS to be continuously output from the output port 22c of the gate drive circuit 22 once an overcurrent is detected by at least one of the overcurrent determination units 11 and 12. This reliably stops the operations of the converter circuit 3 and of the inverter circuit 18. This makes it possible to block the path of the current flowing into the load through the diode connected in inverse parallel with a switching element in the converter circuit 3 or through the parasitic diode of that switching element, thereby enabling reliable protection of the switching elements in the converter circuit 3.

Third Embodiment

Figure 15:
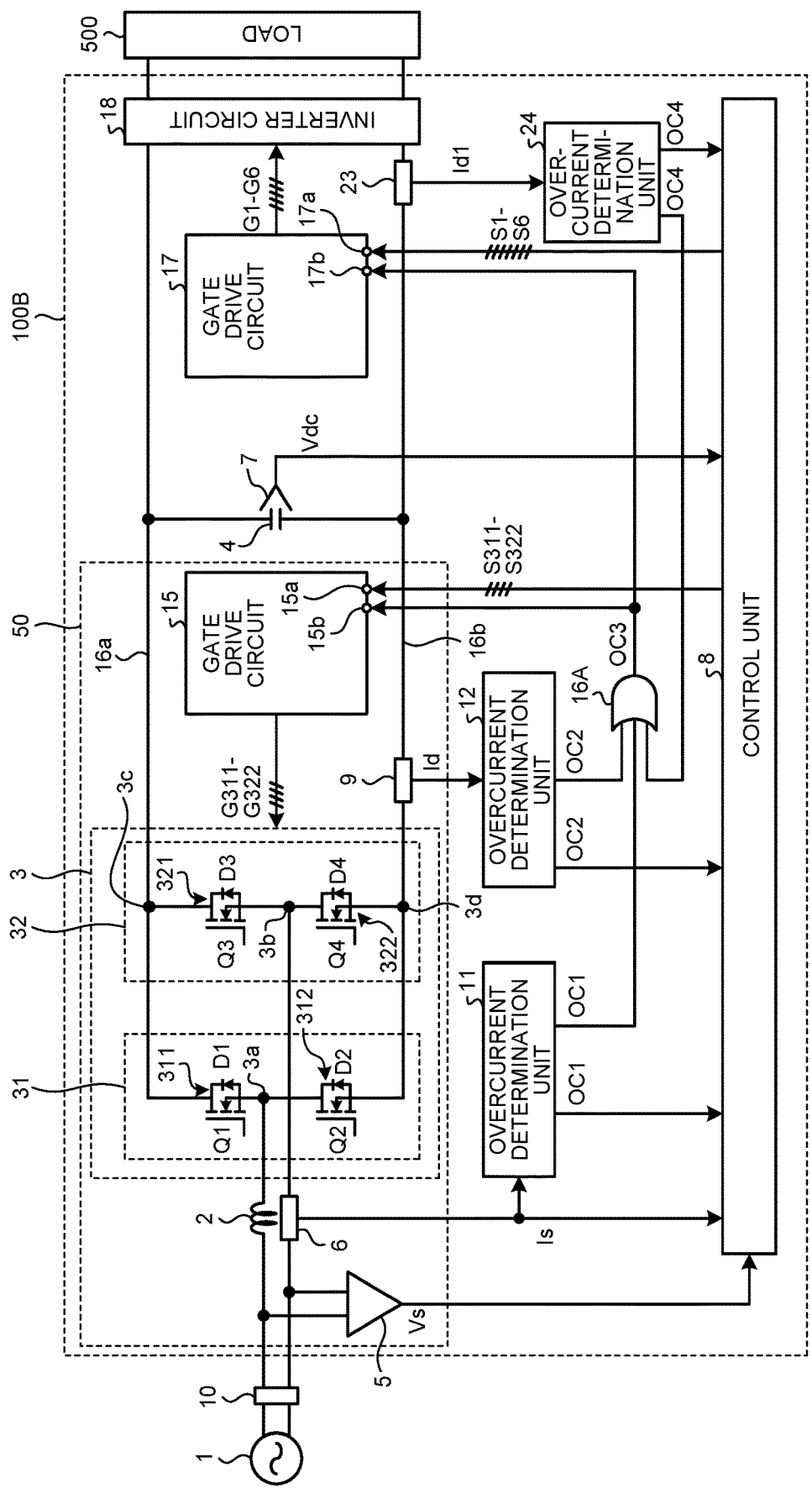
FIG. 15 is a circuit diagram illustrating a configuration of a motor drive device according to a third embodiment.

FIG. 15 is a circuit diagram illustrating a configuration of a motor drive device 100B according to a third embodiment. The motor drive device 100B according to the third embodiment illustrated in FIG. 15 additionally includes a current detector 23 and an overcurrent determination unit 24 as compared to the configuration of the motor drive device 100 according to the first embodiment illustrated in FIG. 1.

The current detector 23 detects a DC current flowing between the inverter circuit 18 and the capacitor 4, and outputs a detected value Id1 of the DC current to the overcurrent determination unit 24. An example of the current detector 23 is a shunt resistor. Note that the DC current flowing between the inverter circuit 18 and the capacitor 4 may be referred to herein as "third current". In addition, although FIG. 15 illustrates the current detector 23 as being disposed on the DC bus 16b, but the current detector 23 may also be disposed on the DC bus 16a. In this case, the current detector 23 detects a DC current flowing between the positive electrode-side terminal of the capacitor 4 and the terminal at the higher potential of the inverter circuit 18.

In addition, the motor drive device 100B according to the third embodiment includes an OR circuit 16A in place of the OR circuit 16 in the configuration of the motor drive device 100 according to the first embodiment. The OR circuit 16A receives a determination result OC4 of the overcurrent determination unit 24 in addition to the determination result OC1 of the overcurrent determination unit 11 and the determination result OC2 of the overcurrent determination unit 12. The determination result OC4 is also input to the control unit 8. Note that the other part of the configuration is the same as or equivalent to the configuration of the first embodiment. The same or equivalent components are designated by the same reference characters, and duplicate description will be omitted.

Figure 16:
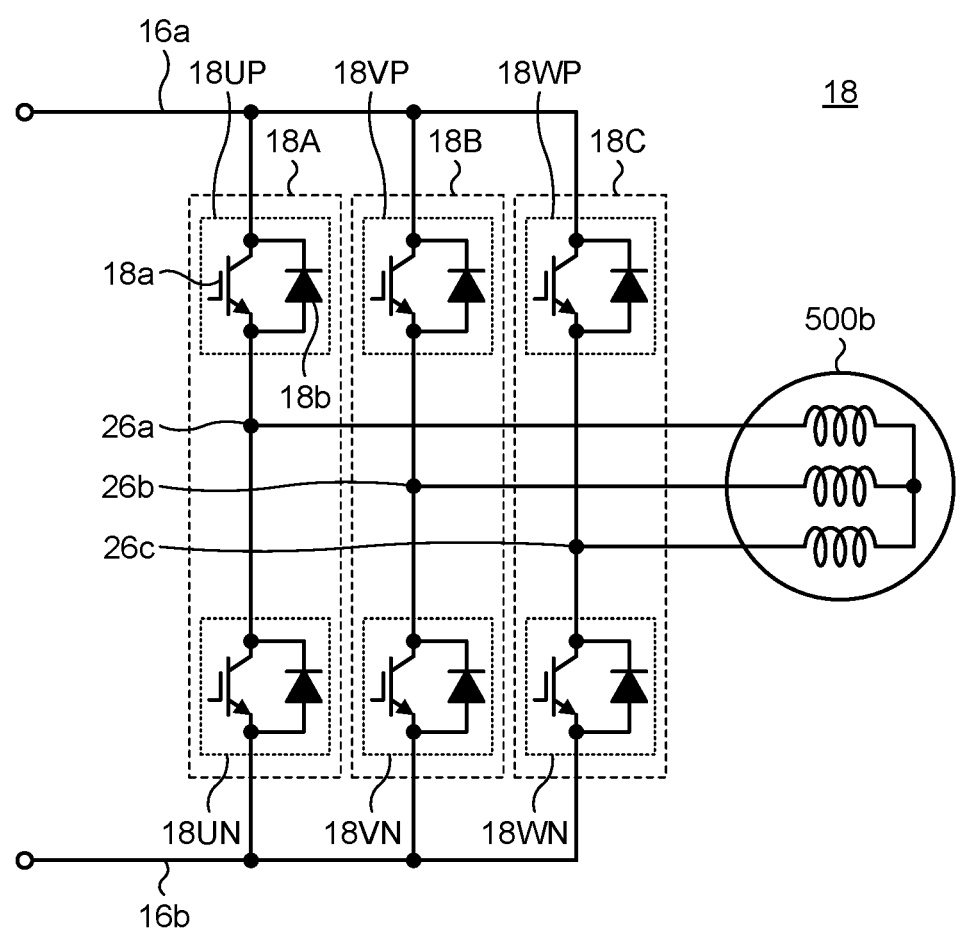
FIG. 16 is a circuit diagram illustrating a detailed configuration of the inverter circuit illustrated in FIG. 15.

FIG. 16 is a circuit diagram illustrating a detailed configuration of the inverter circuit 18 illustrated in FIG. 15. A motor 500b is connected to the output side of the inverter circuit 18. The motor 500b is an example of the load 500.

The inverter circuit 18 includes, as illustrated in FIG. 16, a leg 18A including an upper-arm element 18UP and a lower-arm element 18UN connected in series with each other, a leg 18B including an upper-arm element 18VP and a lower-arm element 18VN connected in series with each other, and a leg 18C including an upper-arm element 18WP and a lower-arm element 18WN connected in series with each other. The leg 18A, the leg 18B, and the leg 18C are connected in parallel with one another. Note that the upper-arm elements 18UP, VP, and WP and the lower-arm elements 18UN, VN, and WN may each be referred to herein as "second switching element".

FIG. 16 illustrates the upper-arm elements 18UP, 18VP, and 18WP and the lower-arm elements 18UN, 18VN, and 18WN each as an insulated gate bipolar transistor (IGBT) by way of example, but these elements are not limited thereto. A MOSFET may be used instead of an IGBT.

The upper-arm element 18UP includes a transistor 18a and a diode 18b connected in inverse parallel with the transistor 18a. The other elements, i.e., the upper-arm elements 18VP and 18WP and the lower-arm elements 18UN, 18VN, and 18WN, are configured similarly. The term "inverse parallel" here means that, similarly to the case of the converter circuit 3, a first terminal serving as the emitter of an IGBT is connected with the anode of the diode, and a second terminal serving as the collector of the IGBT is connected with the cathode of the diode.

Note that FIG. 16 illustrates a configuration including three legs each including an upper-arm element and a lower-arm element connected in series with each other, but the configuration is not limited to this configuration. The number of legs may be four or greater. In addition, the circuit configuration of FIG. 16 is intended for the motor 500b, which is a three-phase motor. In a case in which the motor 500b is a single-phase motor, the inverter circuit 18 will be configured to be suited for a single-phase motor. Specifically, the configuration will include two legs each including an upper-arm element and a lower-arm element connected in series with each other. Note that, regardless of whether the load is a single-phase motor or a three-phase motor, one leg may include multiple pairs of upper- and lower-arm elements.

In a case in which the transistors 18a of the upper-arm elements 18UP, 18VP, and 18WP and of the lower-arm elements 18UN, 18VN, and 18WN are MOSFETs, at least one of the upper-arm elements 18UP, 18VP, and 18WP and the lower-arm elements 18UN, 18VN, and 18WN may be formed of a wide bandgap semiconductor such as a silicon carbide- or gallium nitride-based material, or diamond. Use of a MOSFET formed of a wide bandgap semiconductor can provide advantages of high voltage resistance and high heat resistance.

The upper-arm element 18UP and the lower-arm element 18UN are connected to each other at a connection point 26a connected to a first phase (e.g., U-phase) line of the motor 500b. The upper-arm element 18VP and the lower-arm element 18VN are connected to each other at a connection point 26b connected to a second phase (e.g., V-phase) line of the motor 500b. The upper-arm element 18WP and the lower-arm element 18WN are connected to each other at a connection point 26c connected to a third phase (e.g., W-phase) line of the motor 500b. In the inverter circuit 18, the connection points 26a, 26b, and 26c act as an AC terminals.

Figure 17:
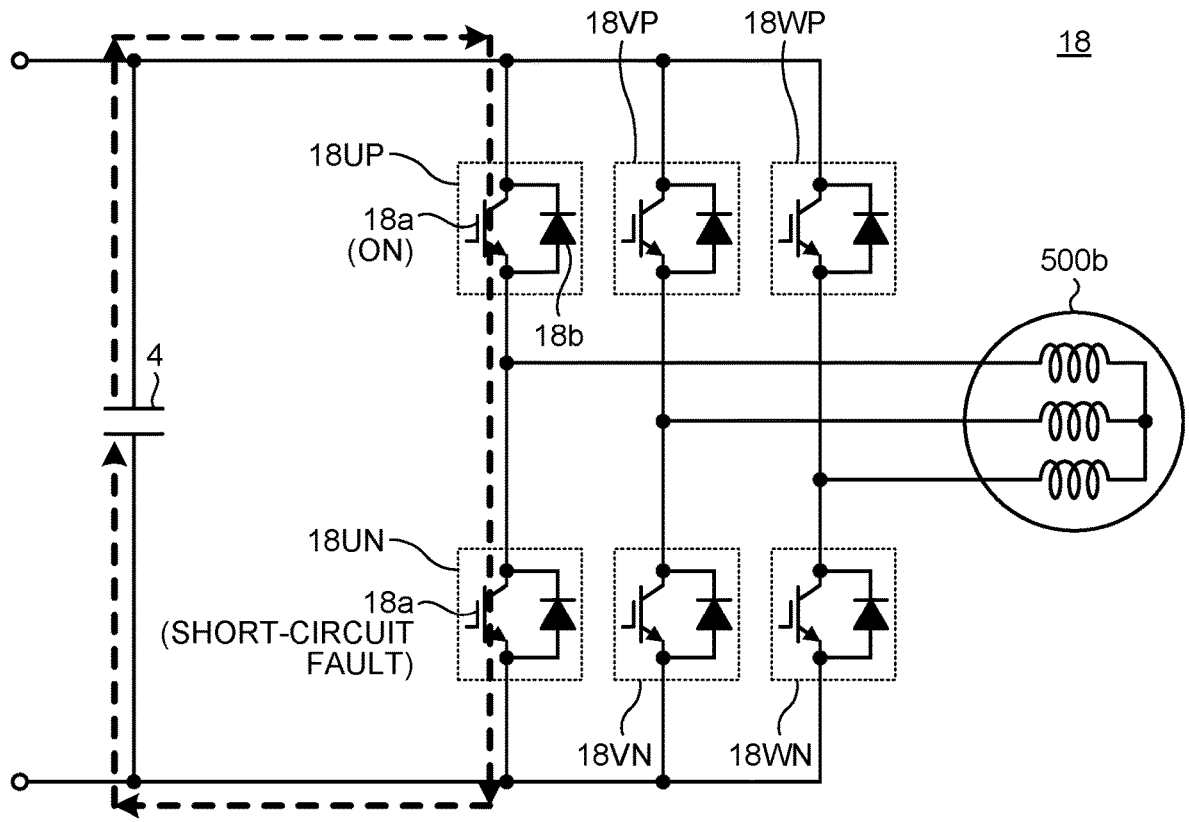
FIG. 17 is a diagram for describing a path of an overcurrent flowing through the inverter circuit of the third embodiment.

FIG. 17 is a diagram for describing a path of an overcurrent flowing through the inverter circuit 18 of the third embodiment. For example, a short-circuit fault of the transistor 18a of the lower-arm element 18UN of the inverter circuit 18 will result in an upper-and-lower-arms short circuit, in which the transistor 18a of the upper-arm element 18UP and the transistor 18a of the lower-arm element 18UN conduct current concurrently, at a timing when the transistor 18a of the upper-arm element 18UP is turned on. FIG. 17 illustrates the current path in such a situation.

The current flowing between the inverter circuit 18 and the capacitor 4 short-circuits the DC voltage although the current flows through the transistors 18a, 18a of the upper- and lower-arm elements 18UP, 18UN. Accordingly, similarly to the case of the converter circuit 3, a high short-circuit current as high as several hundred amperes will flow in several microseconds. This short-circuit current is the cause of the "overcurrent flowing between the inverter circuit 18 and the capacitor 4". Thus, in the third embodiment, whether this short-circuit current is an overcurrent or not is detected by the current detector 23, the overcurrent determination unit 24, and the OR circuit 16A.

An operation of the motor drive device 100B according to the third embodiment will next be described with reference to FIG. 15. As described above, the OR circuit 16A receives the determination result OC4 of the overcurrent determination unit 24. Accordingly, in a case in which the determination result OC4 is a logical "1", the OR circuit 16A sets the logical value OC3 to a logical "1" regardless of the determination results of the overcurrent determination units 11 and 12. Note that the operation in the case of logical "1" is as described in the first embodiment, and detailed description will therefore be omitted here.

The determination result OC4 is also received by the control unit 8. In the case in which the determination result OC4 is a logical "1", the control unit 8 stops generating the control signals S311 to S322, and stops generating the control signals S1 to S6 regardless of the determination results of the overcurrent determination units 11 and 12. As a result, the control signals S311 to S322 are not input to the gate drive circuit 15, thereby stopping outputting of the drive pulses G311 to G322 to the converter circuit 3. The control signals S1 to S6 are not input to the gate drive circuit 17, either, thereby stopping outputting of the drive pulses G1 to G6 to the inverter circuit 18.

Note that in a case in which the determination result OC4 is a logical "0", the operation is performed on the basis of the determination results of the overcurrent determination units 11 and 12. This operation is the operation described in the first embodiment, and detailed description will therefore be omitted here.

The stop control using the overcurrent determination unit 11, the overcurrent determination unit 12, and the overcurrent determination unit 24 is performed only when an overcurrent is flowing. In addition, the stop control using the overcurrent determination unit 11, the overcurrent determination unit 12, and the overcurrent determination unit 24 is performed prior to the stop control being performed by the control unit 8. This enables fast protection control to be performed on the switching elements of the converter circuit 3 and the inverter circuit 18.

Moreover, the stop control by the control unit 8 is performed continuously once an overcurrent is detected. Therefore, the stop control using the overcurrent determination unit 11, the overcurrent determination unit 12, and the overcurrent determination unit 24 and the stop control by the control unit 8 are performed concurrently to thereby reliably prevent propagation of the fault to normal switching elements in the converter circuit 3 and the inverter circuit 18.

As described above, according to the motor drive device according to the third embodiment, the third overcurrent determination unit determines, on the basis of the detected value of the third current flowing between the inverter circuit and the capacitor, whether the third current is an overcurrent or not. Then, when the determination result of the third overcurrent determination unit indicates an overcurrent, the converter circuit and the inverter circuit both stop their operations. This enables more reliable protection of the switching elements in the converter circuit.

Note that the third embodiment has been described as applying, to the configuration of the first embodiment, the stop control performed on the operations of the converter circuit 3 and the inverter circuit 18 on the basis of the result of detection of an overcurrent flowing between the inverter circuit 18 and the capacitor 4, but the application is not limited thereto. The stop control performed on the operations of the converter circuit 3 and the inverter circuit 18 on the basis of the result of detection of an overcurrent flowing between the inverter circuit 18 and the capacitor 4 may also be applied to the configuration of the second embodiment.

Fourth Embodiment

Figure 18:
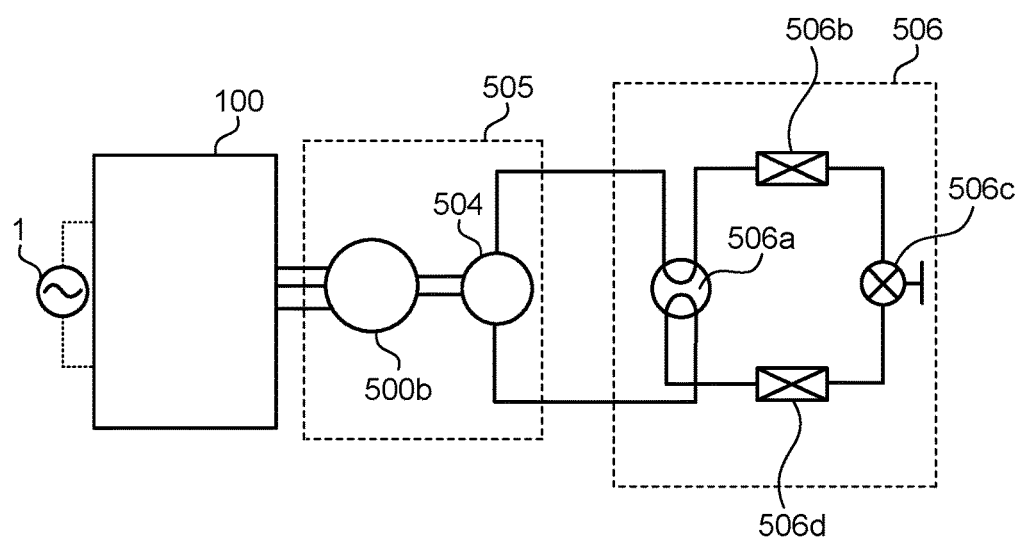
FIG. 18 is a diagram illustrating an example application of a motor drive device according to a fourth embodiment.

A fourth embodiment will be described as an example application of the motor drive devices described in the first through third embodiments. FIG. 18 is a diagram illustrating an example application of a motor drive device according to the fourth embodiment. The motor drive devices described in the first through third embodiments are applicable to a product such as a blower, a compressor, and an air conditioner. The following description will describe an example of application of the motor drive device 100 according to the first embodiment to an air conditioner.

In FIG. 18, the motor 500b illustrated in FIG. 16 is connected to the output side of the motor drive device 100, and the motor 500b is coupled to a compression element 504. A compressor 505 includes the motor 500b and the compression element 504. A refrigeration cycle unit 506 is configured to include a four-way valve 506a, an indoor heat exchanger 506b, an expansion valve 506c, and an outdoor heat exchanger 506d.

The flow channel of the refrigerant circulating inside the air conditioner is formed to extend from the compression element 504 through the four-way valve 506a, the indoor heat exchanger 506b, the expansion valve 506c, the outdoor heat exchanger 506d, and again the four-way valve 506a back to the compression element 504. The motor drive device 100 is supplied with AC power from the AC power supply 1, thereby rotating the motor 500b. Rotation of the motor 500b causes the compression element 504 to compress the refrigerant, thereby allowing the refrigerant to circulate inside the refrigeration cycle unit 506.

Note that the fourth embodiment has been described as the example application of the motor drive device 100 according to the first embodiment to an air conditioner, but the application is not limited thereto. The motor drive device 100A according to the second embodiment may be applied to a blower, a compressor, and an air conditioner. Similarly, the motor drive device 100B according to the third embodiment may also be applied to a blower, a compressor, and an air conditioner. The advantage of the corresponding embodiment can be provided in each case.

In addition, the configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:

1. A motor drive device for driving a motor, the motor drive device comprising:
   a reactor having one end connected to an alternating current power supply;
   a converter circuit connected to another end of the reactor, the converter circuit converting a first voltage into a direct current voltage, the first voltage being an alternating current voltage output from the alternating current power supply;
   a capacitor for smoothing a second voltage, the second voltage being a voltage on a direct current side of the converter circuit;
   an inverter circuit for converting direct current power stored in the capacitor into alternating current power, and supplying the alternating current power to the motor;
   a first current detector for detecting a first current, the first current being an alternating current flowing between the alternating current power supply and the converter circuit;
   a second current detector detecting a second current, the second current being a direct current flowing between the converter circuit and the capacitor;
   a first overcurrent determination unit determining, on a basis of a detected value of the first current, whether the first current is an overcurrent or not; and
   a second overcurrent determination unit determining, on the basis of a detected value of the second current, whether the second current is an overcurrent or not, wherein
   a threshold for the first overcurrent determination unit to detect an overcurrent is lower than a threshold for the second overcurrent determination unit to detect an overcurrent,
   the converter circuit stops operating in a case in which a determination result of either the first overcurrent determination unit or the second overcurrent determination unit indicates an overcurrent, and
   the inverter circuit stops operating in the case in which the determination result of either the first overcurrent determination unit or the second overcurrent determination unit indicates an overcurrent.

2. The motor drive device according to claim 1, wherein the second current detector detects the second current at a detection speed higher than a detection speed at which the first current detector detects the first current.

3. The motor drive unit according to claim 1, wherein the second current detector is delayed in detecting the second current by a delay time shorter than a delay time by which the first current detector is delayed in detecting the first current.

4. The motor drive device according to claim 1, wherein the converter circuit includes a plurality of first switching elements,
   the motor drive device includes a first drive circuit for driving the plurality of first switching elements,
   the inverter circuit includes a plurality of second switching elements,
   the motor drive device includes a second drive circuit for driving the plurality of second switching elements,
   the first drive circuit stops switching operations of all of the first switching elements in the case in which the determination result of either the first overcurrent determination unit or the second overcurrent determination unit indicates an overcurrent, and
   the second drive circuit stops switching operations of all of the second switching elements in the case in which the determination result of either the first overcurrent determination unit or the second overcurrent determination unit indicates an overcurrent.

5. The motor drive unit according to claim 4, wherein at least two of the plurality of first switching elements are switching elements of upper and lower arms, and the second overcurrent determination unit detects an upper-and-lower-arms short circuit caused by occurrence of a short-circuit fault of one of the first switching elements of the upper and lower arms.

6. The motor drive unit according to claim 4, wherein at least two of the plurality of first switching devices are switching elements of upper arms or switching elements of lower arms, and the first overcurrent determination unit detects a power-supply short-circuit caused by occurrence of a short-circuit fault of one of the switching elements of the upper arms or of the switching elements of the lower arms.

7. The motor drive device according to claim 4, comprising:
   a first voltage detector for detecting the first voltage;
   a second voltage detector for detecting the second voltage, the second voltage being the voltage on the direct current side of the converter circuit; and
   a control unit for controlling the converter circuit on the basis of a detected value of the first voltage, a detected value of the second voltage, and the detected value of the first current, wherein
   in the case in which the determination result of either the first overcurrent determination unit or the second overcurrent determination unit indicates an overcurrent, the control unit stops generating control signals for controlling the first switching elements, and stops generating control signals for controlling the second switching elements.

8. The motor drive device according to claim 4, wherein the second drive circuit and the inverter circuit together define an intelligent power module,
   the second drive circuit receives a determination result indicating that at least one of the first overcurrent determination unit or the second overcurrent determination unit indicates an overcurrent, controls operations of the second switching elements on the basis of the received determination result, and when the second drive circuit receives the determination result indicating an overcurrent, the second drive circuit outputs, to the first drive circuit, a signal for stopping an operation of the converter circuit.

9. The motor drive device according to claim 4, comprising:
   a third current detector for detecting a third current, the third current being a direct current flowing between the inverter circuit and the capacitor; and
   a third overcurrent determination unit for determining, on the basis of a detected value of the third current, whether the third current is an overcurrent or not, wherein
   the converter circuit stops operating in the case in which a determination result of the third overcurrent determination unit indicates an overcurrent, and the inverter circuit stops operating in the case in which the determination result of the third overcurrent determination unit indicates an overcurrent.

10. The motor drive unit according to claim 4, wherein an upper-and-lower-arms short circuit is detected, the upper-and-lower-arms short circuit being caused by occurrence of a short-circuit fault of one of switching elements of upper and lower arms included in the plurality of second switching devices.

11. The motor drive device according to claim 4, wherein at least one of the plurality of first switching elements is formed of a wide bandgap semiconductor.

12. The motor drive device according to claim 11, wherein the wide bandgap semiconductor is silicon carbide, gallium nitride, gallium oxide, or diamond.

13. A blower comprising:
the motor drive device according to claim 12.

14. A compressor comprising:
the motor drive device according to claim 12.

15. An air conditioner comprising:
at least one of the blower including the motor drive device, and the compressor including the motor drive device, according to claim 12.

* * * * *